United States Patent [19]

Letscher

[11] Patent Number: 5,094,716
[45] Date of Patent: Mar. 10, 1992

[54] USE OF ANIONIC SURFACTANT/DISPERSANT BLENDS FOR THE DEINKING OF GROUNDWOOD NEWSPRINT

[75] Inventor: Mary B. Letscher, Jacksonville, Fla.

[73] Assignee: Betz PaperChem, Inc., Jacksonville, Fla.

[21] Appl. No.: 584,955

[22] Filed: Sep. 19, 1990

[51] Int. Cl.$^5$ .............................. D21C 5/02
[52] U.S. Cl. ........................ 162/7; 162/5; 162/8
[58] Field of Search .................. 162/5, 6, 7, 8

[56] References Cited

U.S. PATENT DOCUMENTS

| | | |
|---|---|---|
| 2,620,271 | 2/1952 | Ruff et al. ............... 92/1.5 |
| 2,743,178 | 4/1956 | Krodel et al. ............ 92/1.5 |
| 3,072,521 | 1/1963 | Samuelson et al. ....... 162/5 |
| 3,354,026 | 11/1967 | Illingworth ............. 162/5 |
| 3,377,234 | 4/1968 | Illingworth ............. 162/5 |
| 3,392,083 | 7/1968 | Illingworth ............. 162/5 |
| 3,446,696 | 5/1969 | Illingworth ............. 162/5 |
| 3,501,373 | 3/1970 | Illingworth ............. 162/5 |
| 3,932,206 | 1/1976 | Illingworth ............. 162/5 |
| 4,215,447 | 8/1980 | Gartland ................. 156/8 |
| 4,231,841 | 11/1980 | Calmanti et al. ......... 162/5 |
| 4,311,552 | 1/1982 | Brucato et al. .......... 162/5 |
| 4,360,439 | 11/1982 | Calmanti et al. ......... 252/61 |
| 4,599,190 | 7/1986 | Maloney ................ 252/174.24 |
| 4,666,558 | 5/1987 | Wood et al. ............ 162/5 |
| 4,820,379 | 4/1989 | Darlington ............. 162/5 |

OTHER PUBLICATIONS

McCutcheon's, 1975, pp. 45, 236.

Primary Examiner—Karen M. Hastings
Attorney, Agent, or Firm—Alexander D. Ricci; Richard A. Paikoff

[57] ABSTRACT

A composition and method for the improved deinking of groundwood newsprint is disclosed. The composition comprises an amount, effective for the intended purpose, of: 1) an anionic surfactant, e.g., the ammonium or sodium salts of a sulfated ethoxylate derived from a 12 to 14 carbon linear primary alcohol blend, and 2) a dispersant, e.g., naphthalene-formaldehyde condensates.

The method comprises administering a sufficient amount of this combined treatment to a sample of groundwood newsprint for which treatment is desired.

11 Claims, 1 Drawing Sheet

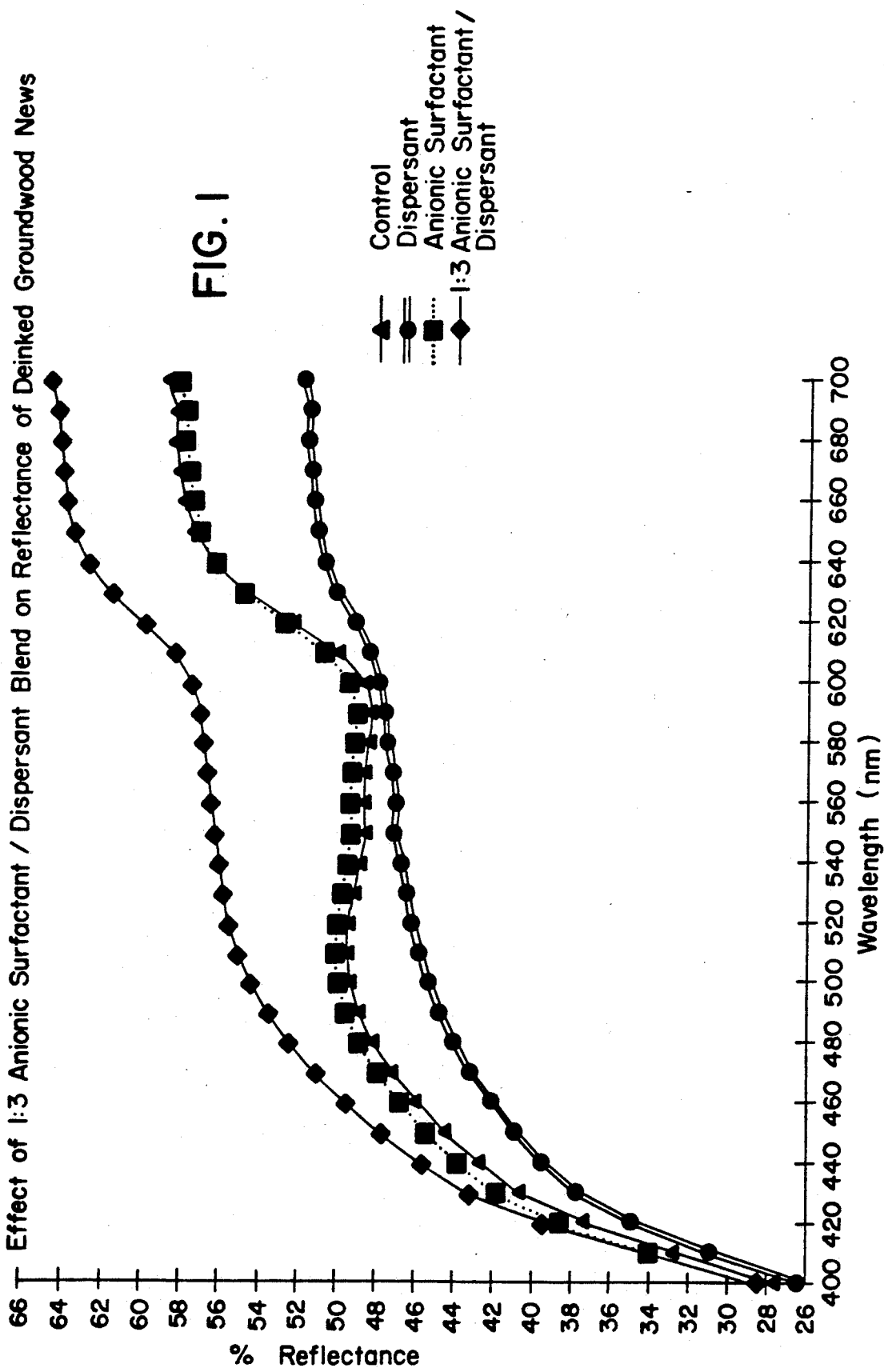

USE OF ANIONIC SURFACTANT/DISPERSANT BLENDS FOR THE DEINKING OF GROUNDWOOD NEWSPRINT

BACKGROUND OF THE INVENTION

High groundwood content newsprint furnishes have unique properties which make them difficult to deink with traditional caustic/surfactant chemistry. Newsprint inks consist primarily of carbon black in a mineral oil and resin vehicle which soaks into the cellulose fibers. Many groundwood based newsprint deinking processes require a combination of chemical and mechanical treatments which can be costly, time consuming and inefficient. They often have the tendency to drive a significant portion of the carbon black particles further into the fibers, which results in a gray pulp unsuitable for use in anything except low grade packaging paper. Furthermore, the use of highly alkaline pulping conditions cause significant yellowing of pulp.

Deinking of groundwood newsprint is of primary interest to mills producing book, magazine and newsprint stock. Many states are beginning to enact legislation requiring publishers to include up to 50% recycled newsprint in their newspapers or face tax penalties. Mills producing gypsum board and packaging are also interested in recycled news as a substitute for more expensive ledger grades and blank newsprint. The expense and long wait for the purchase of mechanical deinking equipment is increasing mill demand for chemical products, which will improve the deinking of a groundwood furnish with little mechanical treatment beyond the pulper.

Increased ink removal from newsprint during deinking is a function of the degree of wetting and dispersion of the carbon black ink particles. These particles are extremely hydrophobic and difficult to wet. Wetting is defined as the process that occurs when solid surface phase (paper and ink) and liquid phase come into contact, the solid-air interface being replaced by a solid-liquid interface. Wetting of the ink particles can be improved by lowering the surface tension of the water and decreasing the contact angle between the water and the particles. This leads to more particles being detached from the fibers and available for removal with the water. The wetting of carbon black particles can be increased, and deinking improved by choosing the proper surfactant. The use of surfactants in the deinking of newsprint has been disclosed in U.S. Pat. No. 3,377,234 and U.S. Pat. No. 4,311,352.

After the carbon black particles are detached from the fibers, the mechanical action of pulping and electrostatic interaction between the particles and paper fibers often causes the ink particles to become reattached in the many small crevices in and around the paper fibrils. This phenomenon may be minimized through the use of dispersants, which keep the ink particles suspended in the water. Dispersants function through two mechanisms: steric hindrance and charge interaction. By surrounding the ink particles with large molecules and increasing their negative charges, the proper dispersant can decrease the amount of ink redeposition on the fibers. The use of surfactants in combination with dispersants has been disclosed in U.S. Pat. No. 4,599,190. However, the surfactant/dispersant blend disclosed in this patent is strictly nonionic.

SUMMARY OF THE INVENTION

The present invention relates to the deinking of groundwood based newsprint at neutral pH with minimal temperature (i.e., 110° F.) and washing.

The components of the present invention comprise a combination of: 1) an anionic surfactant, e.g., the ammonium or sodium salts of a sulfated ethoxylate derived from a 12 to 14 carbon linear primary alcohol blend, and 2) a dispersant, e.g., naphthalene - formaldehyde condensates.

PRIOR ART

The ammonium and sodium salts of a sulfated ethoxylate derived from a 12 to 14 carbon linear primary alcohol blend are commercially available from Vista under the trademarks "Alfonic 1412-A" and "Alfonic 1412-S", respectively.

Naphthalene - formaldehyde condensates are commercially available from Rohm and Haas under the trademark "Tamol SN".

This particular anionic surfactant/dispersant blend has not been previously disclosed.

DETAILED DESCRIPTION OF THE INVENTION

The present invention consists of the addition of an anionic surfactant/dispersant blend to the pulper, in order to enhance the wetting and dispersion of the ink particles, while avoiding the need for caustic addition and subsequent necessary neutralization. The advantage of adding the blend is increased ink removal and improved brightness and reflectance of the pulp, compared to the use of either the surfactant or dispersant alone. The optimal ratio of surfactant to dispersant is 1:3, although any ratio from about 4:1 to 1:9 can be used effectively. As previously stated, the raw materials disclosed in this invention include:

The ammonium or sodium salts of a sulfated ethoxylate derived from a 12 to 14 carbon linear primary alcohol blend (Alfonic 1412-A or Alfonic 1412-S of Vista) and 2. Naphthalene - formaldehyde condensates (Tamol SN of Rohm and Haas).

The chemical structures of these raw materials are as follows:

Alfonic 1412-A
$[CH_3(CH_2)_xCH_2(OCH_2CH_2)_nOSO_3]^-M^+$
$x=10-12, n=3; M=NH_4$
Molecular Weight=436

Alfonic 1412-S
$[CH_3(CH_2)_xCH_2(OCH_2CH_2)_nOSO_3]^-M^+$
$x=10-12; n=3; M=Na$
Molecular Weight=441

Tamol SN
$(C_{10}H_2O_3SCH_2O)_x \times Na$
Molecular Weight=1000

For the application of groundwood based newsprint deinking, the effective anionic surfactants include, but are not limited to, sulfated nonyl phenol ethoxylates, alcohol ethoxysulfate salts, sodium N-methyl-N-oleoyl-taurate, and sodium N-methyl-N-tall oil acid taurate. The effective molecular weight range for the naphthalene-formaldehyde condensate dispersants is about 600–4000.

It is believed that ammonium or sodium salts of a sulfated ethoxylate derived from a 12 to 14 carbon unsaturated or branched primary alcohol blend would also be effective anionic surfactants in this invention. It is further believed that ammonium or sodium salts of a sulfated ethoxylate derived from a 16 to 18 carbon linear, unsaturated or branched primary alcohol blend would be effective as anionic surfactants.

Early in this study, it was determined that high concentrations of ink in newsprint furnish make it impossible to clean the newsprint without at least one mechanical ink removing step. Washing, particularly on a sidehill screen, is an effective mechanical method of ink removal, and was chosen as the means of mechanical treatment.

The optimization of washing as an ink removal step requires that ink particles be made as hydrophilic as possible in the pulper, so that they will be removed with reject water from the washer. Increasing the "water loving" tendency of the ink is achieved by 1) improving the wetting of the particles or 2) decreasing their tendency to deposit on paper fibers through increasing anionic charge and steric hindrance. A blend of surfactants and dispersants appeared to be an effective means for achieving the high degree of wetting and dispersion. A wide variety of surfactants and dispersants were evaluated for their potential as ink wetting and dispersing agents.

Surfactant and dispersant molecules which surround an ink particle can affect its charge. The more negatively charged the wetted ink particles are, the more likely they are to remain dispersed in water and not agglomerate or redeposit on the fibers. A measure of the degree of negative charge on ink particles is known as zeta potential. Specifically, the zeta potential is a measure of electrical potential at the shear surface of a particle. A more negative zeta potential indicates a greater negative charge on ink particles.

The traditional deinking parameter of brightness, along with lightness and an additional parameter, total reflectance, were used for evaluating the cleanliness of treated pulp. Total reflectance is defined as the sum of reflectance values measured between 500 nm and 650 nm at increments of 10 nm. As more ink is removed from the sheet it appears cleaner, and total reflectance increases. This measurement is useful for determining the degree of ink dispersion and removal from the sheets, as well as for ascertaining differences in deinking effectiveness between raw materials.

The inventors have found that by adding to the pulper a combination of anionic surfactant and dispersant, with an anionic surfactant/dispersant weight ratio of from 4:1 to 1:9, greater ink removal from newsprint and increases in brightness and reflectance of pulp are the result.

A 1:3 ratio of surfactant to dispersant was found to be the preferable ratio for deinking. Furthermore, the preferable temperature range for carrying out the process is from 110° to 150° F. No effectiveness is lost at temperatures between 110° and 150° F. Above 150° F., the cloud point of the surfactant is exceeded, and efficiency is lost. The formulation can be used at pH levels of from 4.5 to 9.0. Above a pH of 9.0, color reversion of the lignin in groundwood can occur. A range of from about 20 to 30 pounds of the combination per ton of fiber is to be added to the pulper in order to obtain optimal results.

In order for mills to effectively use the formulation, they must have the following capabilities: 1) at least one stage of washing (preferably sidehill) in order to remove the dispersed ink after repulping, and 2) a clarifier capable of handling a large amount of ink and fiber removed at the sidehill, thereby preventing redeposition of ink onto clean fibers.

In addition, the anionic surfactant in the formulation is high foaming, requiring that it be used in conjunction with a defoamer.

The apparatus used to carry out the following experiments (the pulper) consists of a Waring blender jar with the blades reversed to provide a mixing action of the fibers. The stirring of the blender is controlled by a motor connected to a Servodyne controller. Temperature of the pulp in the blender is provided by a heating mat attached to a temperature controller. The typical furnish consistency in the laboratory pulper is 5%, and a stirring speed of 750 rpm is used to simulate the mechanical action of a hydropulper.

After pulping, the stock was diluted to 1% consistency and formed into three gram handsheets using the Noble and Wood handsheet mold. The handsheets were washed three times in the mold, in order to simulate washing on a sidehill screen or other washing apparatus. One wash is the equivalent of one fill and drain of the handsheet mold.

Handsheets were pressed and dried on the drum dryer at 220° F. Brightness of the handsheets was measured at 457 nm using the G.E. ® brightmeter. Reflectance of the handsheets was measured on the Hunter Lab Scan Spectrophotometer.

Surface tension measurements on 0.05% solutions of the products were carried out using the Cahn DCA-312. Zeta Potentials of carbon black particles suspended in 0.05% solutions of the products were determined using the Mobility Meter Mark II from Paper Chemistry Laboratory, Inc.

BRIEF DESCRIPTION OF THE DRAWING

FIGURE 1 shows the reflectance increase of the pulp after treatment as described below.

DESCRIPTION OF PREFERRED EMBODIMENT

The purpose of this experiment was to determine what ratio of surfactant to dispersant gave the most effective deinking of groundwood news. Surprisingly, it has been found that when Alfonic 1412-S and Tamol SN are blended in a 1:3 ratio of Alfonic 1412-S:Tamol SN, the resulting mixture lowers the surface tension of the water, increases the negative charge of the carbon black particles and increases the brightness of repulped newsprint.

The following laboratory results demonstrate the effectiveness of the Alfonic 1412-S/Tamol SN blend for lowering the surface tension of the water, increasing the negative charge of the carbon black particles and increasing the brightness of repulped newsprint. Fifty pounds of newspaper (100% groundwood) was selected as the standard furnish.

| Sample | Surface Tension* dynes/cm | Zeta Potential** of Carbon Black | Brightness*** |
|---|---|---|---|
| Control | 72.0 | −25.31 | 44.44 |
| Tamol SN | 69.7 | −58.24 | 40.00 |
| Alfonic 1412-S | 36.8 | −43.63 | 44.21 |
| 1:3 Alfonic 1412-S/ | 45.2 | −58.46 | 48.88 |

| Sample | Surface Tension* dynes/cm | Zeta Potential** of Carbon Black | Brightness*** |
|---|---|---|---|
| Tamol SN | | | |

*Surface tension of 0.05% solution in distilled water.
**Zeta Potential of carbon black particles suspended in 0.05% solution in distilled water.
***Reflectance of pulp at 457 nm after three washes in Noble and Wood handsheet mold.
Pulping conditions:
pH = 7.0
Temperature = 110° F.
Pulping Time = 45 minutes
Dosage = 30 lbs/ton of fiber based on active chemical The reflectance increase of the pulp after treatment and three washes in the handsheet mold is given in FIGURE 1.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

I claim:

1. In the process of the deinking of groundwood newsprint, an improvement for allowing greater ink removal from the newsprint and increasing the brightness and reflectance of pulp, said improvement comprising adding to the pulper an amount, sufficient for the intended purpose, of a combination of (a) an anionic surfactant selected from the group consisting of an ammonium or sodium salt of a sulfated ethoxylate derived from a C12–C18 primary alcohol blend, sodium N-methyl-N-oleoyltaurate, and sodium N-methyl-N-tall oil acid taurate, which serves to wet ink particles, said anionic surfactant used in conjunction with a defoamer, and (b) a naphthalene-formaldehyde condensate, which keeps ink particles suspended in water, wherein the weight ratio of (a):(b) is from about 4:1 to 1:9.

2. The process as recited in claim 1 wherein about 20–30 pounds of a combination of (a) and (b) per ton of groundwood newsprint is added to the pulper.

3. The process as recited in claim 1 wherein the C12–C18 primary alcohol blend is linear.

4. The process as recited in claim 1 wherein the C12–C18 primary alcohol blend is unsaturated.

5. The process as recited in claim 1 wherein the C12–C18 primary alcohol blend is branched.

6. The process as recited in claim 1 wherein the molecular weight range of the naphthalene-formaldehyde condensate is from 600–4000.

7. The process as recited in claim 1 wherein the ratio of (a):(b) is about 1:3.

8. The process as recited in claim 1 wherein ink is removed from groundwood newsprint at a pH of from about 4.5–9.0.

9. The process as recited in claim 8 wherein the pH is about 7.0.

10. The process as recited in claim 1 wherein ink is removed from groundwood newsprint at temperatures between 110° F. and 150° F.

11. The process as recited in claim 10 wherein the temperature is about 110° F.

* * * * *